United States Patent Office 3,698,981
Patented Oct. 17, 1972

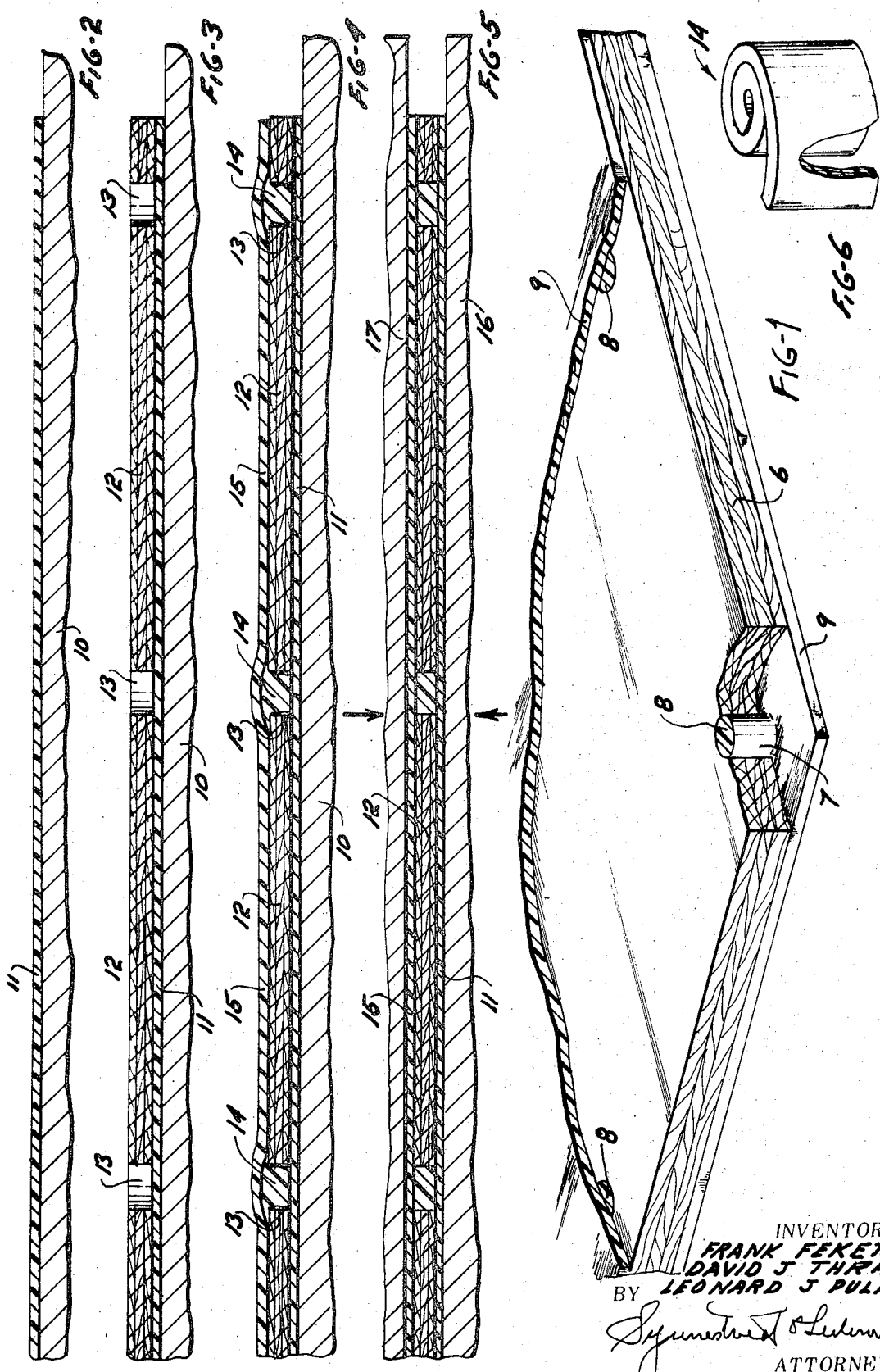

3,698,981
POLYESTER LAMINATE AND METHOD
FOR MANUFACTURE
Frank Fekete, Monroeville, David J. Thrash, Ruffs Dale, and Leonard J. Pulman, Pittsburgh, Pa., assignors to Koppers Company, Inc.
Continuation-in-part of application Ser. No. 798,951, Feb. 13, 1969. This application July 15, 1969, Ser. No. 841,744
Int. Cl. B32b 31/04
U.S. Cl. 156—293        3 Claims

ABSTRACT OF THE DISCLOSURE

The laminate is made of a core formed for example of a plurality of plies of wood, with apertures extended through the core, and having sheets of fiber reinforced polyester resin material cured under pressure at opposite faces of the core, and further having fiber reinforced polyester resin plugs infilling the apertures in the core and cured and inter-bonded with the polyester resin sheets at opposite faces of the core, thereby providing against delamination of the plies of the core.

---

The application of fiber reinforced polyester resin sheets to opposite faces of a multiple ply core is known, for instance as disclosed in our U.S. application Ser. No. 798,951, filed Feb. 13, 1969, now abandoned, of which the present application is a continuation-in-part. As disclosed in said prior application, the laminate is formed by applying to opposite faces of the core or substrate fiber reinforced polyester resin mats in a form in which the resin, although uncured is prethickened or pregelled, especially by the use of certain chemical thickening agents which render the mat substantially form stable, so that it may be readily applied to the core and retained in the desired position during the course of manufacture of the laminate. According to said prior application, after assembly of such mats with a core or substrate, in the manner of a sandwich, the assembly is heated and subjected to pressure, for instance in a flat bed press, in order to cure the resin and to cause it to tightly adhere to the opposite faces of the core.

Polyester coated or laminated products made as described above are characterized by exceptional resistance to separation of the resin coatings or sheets from the core. Indeed, the adherence of the resin coatings to the faces of the core is even stronger than is the adherence between the individual plies of wood where a plywood core is employed. Products of the kind prepared according to the invention may be used as structural members, interior and exterior side boards, decorative panels, flooring, containers, etc.

However, under certain conditions, a problem has been encountered in the fabrication of and in the use of polyester laminates which have a multi-plied core, such as for example, a plywood core. The problem is that the plies comprising the core have a tendency to delaminate, that is the plies tend to separate. It has been observed that such delamination can be caused by a variety of conditions. Delamination is undesirable because it reduces the structural stability of the product.

As to the causes of delamination, it has been found that the pressure utilized in the fabrication of the laminate can be sufficiently high to weaken and rupture the bonds between the individual plies of a plywood substrate. This leads to delamination of the plies. It has been found also that excessive amounts of moisture in a plywood substrate can cause delamination during the fabrication of the laminate. Under the influence of heat and pressure, moisture in the plywood vaporizes and upon release of the press, the steam, as it expands, can weaken or rupture the bonds between the individual plies.

Delamination of the plies during fabrication of the laminate can be avoided by carefully controlling the pressure applied by the press, the temperatures utilized to cure the polyester and the amount of moisture in the plywood. However, this is somewhat impractical when attempting to operate an efficient production line process in view of the fact that moisture content and ply strength may vary from one piece of plywood to the next.

Delamination of plies comprising a multi-plied core has been experienced also under certain conditions of use notwithstanding the fabrication of a defect-free laminate. For example, it has been found that the use of a high speed saw to cut a piece of polyester coated plywood to a desired shape or size can cause separation of the plies. In addition, it has been found that delamination is a problem when polyester coated plywood having uncoated or exposed edges is used in an environment where moisture is present. Moisture tends to accumulate in the plywood and cause a weakening and eventual rupture of the bonds between the plies of the board.

Attempts have been made to solve the delamination problem, but for one reason or another they have been unsatisfactory. For example, one attempt included the insertion of staples into the plywood in order to supplement the adhesive bond between the plies. This proved to be unsatisfactory for a number of reasons. In applying a relatively thin coating of polyester resin to the plywood, the outlines of the staples are observable on the surface of the coated product. This detracts from appearance. This problem can be avoided by applying a thicker coating, but this can result in a different and more serious problem when the coated product is cut with a high speed saw. The saw, if unintentionally moved into contact with the hidden staples, can have its teeth stripped and thrown in unpredictable directions. This creates an extremely hazardous condition.

It has been proposed also that the tendency of the plywood core to delaminate can be reduced or avoided by using laminating adhesives of increased strength to bond the plies comprising the core. This has the disadvantage that special batches of plywood with the higher strength adhesive would have to be made-up by the plywood manufacturer. Moreover, the conditions of heat and pressure utilized in curing the polyester and fabricating the laminate would in all likelihood tend to weaken the bond between the plies notwithstanding the use of increased strength adhesives. This could lead eventually to delamination of the plies under conditions of use as described above.

With the foregoing in mind, it is an object of the present invention to provide for the production of laminates of the kind referred to above in a manner such that delamination of a multi-plied core is avoided or if it does occur, the problems resulting therefrom are substantially mitigated.

In a typical embodiment of the invention, the foregoing is achieved by providing a multiplicity of apertures extended through the core and by plugging the apertures with resin material, preferably the same type of prethickened fiber reinforced resin material from which the sheets at the side faces are formed. Alternatively, the polyester resin plug can have a different chemical identity than the polyester resin facing sheet and can be thickened with a different chemical thickening agent and can have a different type of glass reinforcement, e.g., glass mat vs. chopped glass roving. It is essential, however, that the two resins be of types which will bond together. When these products are consolidated and cured under heat and pressure, resin materials of the plugs and of the facing sheets are inter-bonded and rendered homogeneous. The curing of the resin materials of the plugs and of the coating sheets to inter-bond the resin materials of the plugs and sheets produces a product of exceptional strength and resistance to delamination within the core itself and can also improve the adhesion of the polyester coating to the faces of the core.

How the foregoing objects and advantages are attained will appear more fully from the following description referring to the accompanying drawings, in which:

FIG. 1 is an isometric fragmentary view of a board-like laminate constructed according to the present invention, the view being shown partly in section and partly broken away in order to illustrate the interior construction;

FIGS. 2 to 5 illustrate steps in a preferred method for making a laminate according to the invention and of these figures;

FIG. 2 is a transverse sectional view illustrating a mat or layer of prethickened polyester resin material laid upon a support;

FIG. 3 is a transverse sectional view of a plywood core having apertures therethrough and placed over the prethickened mat on the support;

FIG. 4 is a view similar to FIGS. 2 and 3 but illustrating plugs of resin material in the apertures of the core and illustrating the application of a second mat or sheet of prethickened polyester resin material on top of the core;

FIG. 5 illustrates the assembly of parts of FIG. 4 placed in a press comprising lower and upper press plates which are shown brought together to apply pressure to the assembly as contemplated in the curing operation; and FIG. 6 is a view illustrating a method for making the plugs to be inserted into the apertures in the core.

The figures of the drawings illustrate one embodiment of a product and of a method for producing the product, which embodiment may be considered as typical. This typical embodiment is described hereinafter, but it is to be understood that many features may be modified as compared with the described typical embodiment, as will be pointed out hereinafter.

Referring first to the product as shown in FIG. 1, a sheet of plywood 6 comprises the core or substrate of the laminate. This plywood sheet is provided with a multiplicity of apertures 7 which are filled with fiber reinforced polyester resin material 8 which upon curing is inter-bonded with the coating sheets of fiber reinforced polyester resin 9—9 positioned at opposite faces of the core as they are cured.

The distribution and the arrangement of the apertures 7 and thus of the plugs 8 of the resin material depend on a number of factors which include, for example, the size of the core, the environment in which the final product is used, and the quality of the bonds between the plies of the core. It is preferred that apertures be placed near the edges of the core and particularly at the corners of the core. By way of example, it has been found that good results can be obtained with an 8 inch x 8 inch core by placing one aperture near each corner of the core. On the other hand, when working with a larger sized core, for example 3 feet x 10 feet, it is preferred that the core be provided with apertures not only near the corners of the core but also along the edges between the corners, for example, one aperture at the half way points of the 3 foot sides and at the quarter points of the 10 foot sides, thus giving a total of 12 apertures. It should be appreciated that the spacing between the apertures and the number of apertures can be varied according to the tendency of the core to delaminate. Also, it should be appreciated that, in certain applications, it may be desirous to have a random distribution of apertures. This random distribution would be advantageous when producing under commercial automated conditions huge laminate structures which would be fabricated into smaller units. If the fabricating was done by sawing, there would be a distinct possibility that, in the case where the apertures were regularly spaced, the saw would cut through an entire row of resin plugs and tend to weaken the laminate. A random distribution on the other hand ensures that uniform cutting of plugs will not occur. The size of the apertures may be varied also, but in a typical case apertures ranging in size from about one-half to about 1 inch in diameter are appropriate.

The invention also contemplates the provision of apertures infilled with plugs of polyester resin positioned in the central area of the plywood core. Such plugs can function as reinforcing members to give added strength to the laminate.

Referring now to the sequence of operations illustrated in FIGS. 2 to 5 inclusive, the reference numeral 10 indicates any suitable support on which the laminate is assembled. In assembling the various components making up the typical product, a mat or sheet of prethickened uncured fiber reinforced polyester resin material such as indicated in section at 11 is first placed upon the support 10, as indicated in FIG. 2. A plywood core 12 having apertures 13 therein is placed upon the mat 11, as is indicated in FIG. 3. Plugs 14 of prethickened uncured fiber reinforced polyester resin material are then inserted into the apertures 13 as is indicated in FIG. 4. Advantageously these plugs 14 are formed by rolling up portions of mat such as used for the facing sheets, as indicated in FIG. 6, and it is preferred that the plugs be sufficiently long so that they will project some appreciable distance above the top surface of the plywood core 12, for instance a distance of about one-quarter to one-half inch above the plywood. This extra length of the plugs will ensure complete infilling of the apertures notwithstanding the fact that there will be some space or voids between the turns or layers of the plugs when formed in the manner indicated in FIG. 6. As will be seen in the sectionallized portion of FIG. 6, the fibers are extended predominantly axially of the plug. A second mat or sheet 15 of prethickened uncured fiber reinforced polyester resin material is then applied over the top of the plywood core and plugs and, as indicated in FIG. 4, this may partially flatten and projecting upper ends of the plugs 14.

After the assembly of the various components as described above, the assembly is moved into the press, for instance by sliding the assembly off an edge of the support onto the press bed 16 shown in FIG. 5. The upper member 17 of the press is then brought down in order to apply pressure to the assembly and at this time heat is applied in order to consolidate the product and to cure the resin materials and inter-bond the resin materials of the facing sheets and plugs and thus form a homogeneous structure. In a typical operation, the pressure applied can be within the range of about 100 p.s.i. to about 300 p.s.i. and the heat applied sufficient to cause curing of the resinous material. Pressures of at low at 50 p.s.i. and as high at 1000 p.s.i. can be used depending upon the substrate being used. In general, the curing temperature of the material will be in the range of about 220° F. to about 260° F., although temperatures as low as 180° F. and as high as 325° F. can be used.

As noted hereinabove, the resin facing sheets and plugs, upon curing, are inter-bonded, that is, molecules of the plug are crosslinked with molecules of the facing sheets to form an integral structural unit comprising interconnected facing sheets between which is sandwiched the multi-plied core material. It is further noted that polyester resins upon curing tend to shrink. Thus, the resin plugs tend to shrink as they cure. As the resinous material of the plugs shrinks and crosslinks with the resinous material of the sheets, the plugs, which are under tension due to shrinkage, tend to pull the facing sheets toward each other and this exerts a compressive force on the multi-plied core. The overall result of this is the fabrication of a laminate which consists of a multi-plied core sandwiched between cured resinous coatings which exert a compressive force on the surfaces of the core to which the coatings adhere. This very effectively reduces the tendency of the plies of the core to delaminate. Even if the bonds of the core plies are ruptured, the compressive force exerted by the inter-bonded resins coatings maintain the plies together and in close contact with each other.

In view of the action just described even where moisture in the core tends to delaminate the core upon release of the press after curing, the effect of that tendency is diminished. However, the core that is placed in the press should have a moisture content of no more than about 10 wt. perecent and preferably less than about 6 wt. percent.

It should also be understood that a laminate may be prepared in which the edges of the core are exposed, as in the illustrative embodiment above described, or, alternatively, a laminate may be prepared in which the entire core is encapsulated within a convering layer of the resin material, in which latter case a die or press structure may be employed having a mold wall for forcing the outer surface of the coating at the edges of the core.

In order to ensure complete covering of the core adjacent the margins or edges of the core, a strip of the mat material may be laid on the plywood along lines spaced somewhat inwardly from the edges, so that in this region two thicknesses of mat will be present and thus will provide an adequate supply of resin which will spread toward the edges upon operation of the press and thus assure complete coverage in the edge region.

Where the size of the core to be covered is greater than the size of the mats, it is preferred to overlap adjacent edge portions of adjacent mats, although it is desirable to avoid having lines of overlap in registry with each other at both faces of the core. This will ensure complete coverage of the core without noticeable joint lines, while at the same time avoiding excessive overall thickness of the laminate in localized areas, with resultant irregularity in thickness of the product.

The plugs can be formed in a variety of ways. As indicated hereinabove, it is preferred to use plugs comprising prethickened, uncured, fiber reinforced polyester resin. A convenient source of material for such plugs is the trimmings of the sheets or mats used to cover the faces of the core. The plugs can be formed by rolling up a strip of the trimmings. Preferably, the sheets or mats, as well as the plugs, are made from a polyester resin formulation which in the thickened state is substantially tack-free. This facilitates handling.

Most preferably, the fibers dispersed in the resinous material of the plug should be predominately oriented so that they lie in planes which are angled with respect to the mean plane of the laminate. Cured plugs having the fibers so oriented are stronger than plugs which have fibers lying in planes which are parallel to the mean plane of the laminate.

An alternative method of forming the resin plugs is by extruding through an orifice a resin formulation containing a filler such as clay and preferably having fibers dispersed therein, to form a rod and cutting the rod into appropriate lengths.

Another way of forming the plugs is by pouring liquid polyester resin which preferably has fibers dispersed therein, into the apertures. For example, the liquid polyester resin can be poured into the apertures 13 of the sheet 12 shown in FIG. 3 of the drawings, or the liquid resin may be deposited upon the plywood and then spread so as to enter the apertures, and then the excess removed.

A prethickened resin plug has an indefinite shelf life. This has the advantage that the apertures in the plywood core may be plugged with prethickened polyester resin, and the cores stacked until time for use. In practice, the plugged plywood core may be prepared in one location, for instance, where the plywood is manufactured, and then sent to another location where the prethickened polyester resin sheets are to be molded into the finished product.

Although the use of a plywood core constitutes a typical and preferred embodiment of the invention, it should be understood that the invention is also of use in connection with other cores, for instance certain pressed fiberboard cores which may have a tendency to delaminate, unless special provision is made to prevent such delamination. Moreover, the interconnection of the facing sheets of fiber reinforced resin material by the intervening fiber reinforced resin plugs provides a structure of such strength that it may even be employed to secure together two or more boards or plies which are not adhesively laminated or otherwise secured to each other.

In some cases, delamination may be prevented even where one of the resinous face sheets is omitted completely. The molding and curing of the resinous material of the plugs under pressure is capable of securing such tight engagement with the walls of the apertures in the substrate that the tendency of plies of the substrate to delaminate will be reduced.

The prethickened or pregelled fiber reinforced polyester resin mats or sheets which can be used in the fabrication of laminates according to the present invention and the preferred polyester resin materials from which the plugs can be made are well known. Speaking generally, the mats are prepared by adding a chemical thickening agent to a liquid composition containing an unsaturated polyester, a crosslinking agent, and a crosslinking catalyst. Unsaturated polyesters are prepared by reacting an olefinically unsaturated dicarboxylic acid with a saturated dicarboxylic acid and with a polyhydric alcohol. Examples of such reactants include maleic anhydride, fumaric acid, itaconic acid, phthalic acid, adipic acid, propylene glycol, diethylene glycol and ethylene glycol.

Examples of crosslinking agents are monomers such as styrene, vinyl toluene and chlorostyrene.

A typical crosslinking catalyst that is frequently included in the curable composition in benzoyl peroxide.

Chemical thickening agents which are utilized to increase the viscosity of the liquid polyester composition are also well known. Examples of such agents include magnesium oxide, calcium hydroxide, and a mixture of magnesium oxide and an aliphatic monocarboxylic acid (or anhydride thereof). Such thickening agents are described in U.S. Pat. Nos. 2,568,331 and 3,390,205. Other polyester thickening agents are disclosed in the following copending U.S. applications which are assigned to the same assignee as the present application:

Ser. No. 679,876, issued Sept. 2, 1969, as Pat. 3,465,061 discloses the thickening of a polyester resin formulation by adding thereto an oxide of a Group II–A metal and an anhydride containing a cyclic hydrocarbon;

Ser. No. 658,826 now Pat. No. 3,538,188 discloses the thickening of a polyester resin formulation by adding thereto magnesium oxide or magnesium hydroxide in combination with lithium chloride, lithium bromide, or lithium nitrate.

The liquid polyester resin formulation may be thickened also by adding to it a polymerizable monomeric material which is not capable of polymerizing with either the unsaturated polyester or with the crosslinking agent. The polymerizable monomeric material can be polymerized in situ in the liquid polyester resin formulation to thereby increase the viscosity of the formulation, but without polymerizing the unsaturated polyester or the crosslinking agent. Examples of such thickening systems are disclosed in the following copending U.S. applications which are assigned to the same assignee as the present application.

Ser. No. 671,849 now abandoned discloses the thickening of a polyester resin formulation by adding thereto a vinyl ether monomer and a catalyst which causes homopolymerization of said monomer to form a polymerized vinyl ether;

Ser. No. 679,735 now Pat. No. 3,519,698 discloses the thickening of a polyester resin formulation by adding thereto furfuryl alcohol and bis-(hydroxy methyl) phosphinic acid which causes said alcohol to homopolymerize;

Ser. No. 668,585 now Pat. No. 3,574,788 discloses the thickening of a polyester resin formulation by adding thereto N-vinyl carbazole and triphenyl phosphite which causes said carbazole to homopolymerize.

It should be understood that other thickening agents can be used also and that the thickening of the polyester resin formulation is not brought about by the commencement of vinyl copolymerization between the unsaturated polyester resin and the crosslinking agent.

It is preferred to utilize as the thickening agent a mixture of calcium oxide and either magnesium oxide or calcium hydroxide as described in U.S. Pat. No. 3,431,320. The use of such a mixture has the advantage that the viscosity build up of the composition is delayed for a period of time such that the fiber reinforced mats can be formed without a premature gelling or thickening of the liquid composition. It is thus possible to properly disperse and wet the reinforcing fibers, such as glass fibers, when forming the mat. The initial desired delay in thickening of the composition is followed by a rapid build up in viscosity and thus shape retaining mats, which are easy to handle, can be produced relatively quickly.

The following is illustrative of operations according to the invention:

For the exterior facing of a plywood core, a sheet of woven roving glass fabric is drawn through an impregnating bath. This bath is formed by dissolving an unsaturated polyester resin (formed by condensing two moles of propylene glycol with one mole of maleic anhydride and one mole of phthalic anhydride to achieve a molecular weight of about 1200) in sytrene monomer cross-linking agent. The resutling solution comprises 65 wt. percent polyester resin and 35 wt. percent styrene monomer. Added also is t-butyl perbenzoate crosslinking catalyst, to the extent of about 1% by weight based on the weight of the solution. In addition, there is added a thickening agent consisting of a mixture of calcium oxide and calcium hydroxide, each in an amount of 2% by weight based on the weight of the solution. The fabric so impregnated is drawn between opposed accurately spaced gauging rolls to remove excess resin solution and to ensure complete penetration of the resin solution between the filaments. A thin sheet of polyethylene is fed over both gauging rolls into contact with both sides of the impregnated sheet. The resin which has impregnated the fabric begins to thicken within about three hours, and, after two days, the resulting sheet is pliable and tack-free.

The sheet has smooth surfaces containing about 45% by weight glass. The polyethylene readily peels away from the impregnated sheet.

The sheet is trimmed to the desired dimension to facilitate application to the plywood core.

A series of holes are drilled through a three-ply birch plywood sheet (¼ inch in thickness). The holes are ½ inch in diameter. One hole is located near each cover of the plywood sheet. The holes are then filled with the fiber reinforced plugs.

To make the plugs, a sheet material which has been made to serve as the facings is cut into strips approximately 2½" long and ¾" wide These strips are rolled into plugs having diameter to fit the holes in the plywood and a length of ¾ inch. The plugs are inserted into the apertures in the plywood core. The plywood core is placed on a thickened polyester resin sheet made as described above. The plugs extend about ¼ inch beyond the upper surface of the plywood core.

Another thickened polyester resin sheet is then applied to the upper surface of the plywood core to form the exterior facing for the core. The resulting sandwich is placed in a metal matrix mold and molded therein at about 200 p.s.i. and about 275° F. for about four minutes.

Upon completion of the molding, the resin-impregnated glass sheet has formed into a hard infusible thermoset and is firmly bonded to the plywood substrate. A cut across the laminate and through the area of the polyester plugs is made with a circular saw with coarse offset teeth. The polyester resin facing sheet and the polyester resin plug are seen to be homogeneously bonded to one another and each to be bonded to the core. No delamination of the plies of wood occurs. However, by way of comparison, it is found that, when a laminate structure was made, without the glass-reinforced polyester resin plugs and the laminate is sawed with the same circular saw, a distinct delamination of the plies of the plywood core is observed.

If desired cellphane coated sheets of the thickened but uncured fiber reinforced polyester resin may be stored for a matter of months. Plugs formed of such sheets may also be stored if desired and such plugs may be inserted in apertures formed in plywood panels as the panels are made, the panels being subsequently delivered to another location for assembly with facing sheets and ultimate lamination.

In accordance with another procedure conforming with the invention, a thickened but uncured polyester resin facing sheet containing fiber reinforcements and made as described above, is laid upon a support and a plywood core having holes drilled therethrough is placed upon the facing sheet. A liquid polyester resin material containing glass fibers is then poured into the apertures in the core.

In an operation of the kind just referred to, a suitable resin formulation for use in pouring the plugs may be prepared in the following manner:

65 parts by weight of a solution of a polyester resin (made by condensing 2 moles of propylene glycol with one mole of maleic anhydride and 1 mole of phthalic anhydride to achieve a molecular weight of about 1200) dissolved in 35 parts by weight of styrene monomer are mixed in a sigma-type mixer with about 40 parts by weight of chopped glass fibers (about 9–10 mm.). There is also added 1 part by weight of t-butyl perbenzoate. After thorough mixing this formulation may be poured into the holes in the plywood core and a second facing sheet placed on top of the core sheet. The holes should preferably be completely filled with the resin material.

A sheet assembly of this kind may then be laminated by application of heat and pressure in the manner described above.

We claim:

1. A method for making a fiber-reinforced resin coated board, comprising placing a sheet of substantially uncured polyester resin having reinforcing fibers dispersed therein upon a support, the resin of said sheet containing a thickening agent and being of viscosity providing a flexible but shape retaining sheet, placing a substantially rigid board core upon said sheet, the core having spaced apertures therethrough, inserting plugs of said uncured polyester resin in the apertures of the core, placing a second sheet of said uncured polyester resin having reinforcing fibers dispersed therein upon the other face of the core, forcing the sheets into intimate interengagement with the core and with the plugs by applying pressure to the assembly, and applying heat to the assembly to cure and inter-bond the resin of the sheets and plugs.

2. A method for making a fiber-reinforced resin coated board, comprising assembling a sandwich comprising a board core and a pair of sheets of substantially uncured polyester resin material at opposite faces of the core, the core having spaced apertures therethrough, providing substantially uncured polyester resin plugs in the core apertures, the resin of the sheets and plugs having reinforcing fibers dispersed therein and the resin of said sheets containing a thickening agent providing a viscosity sufficiently high to render the resin shape retaining, placing the sandwich under pressure, and applying heat to the assembly to cure and inter-bond the resin of the sheets and plugs.

3. A method according to claim 2 in which the sandwich is prepared upon a support and after preparation is inserted and pressed between heated press members.

References Cited

UNITED STATES PATENTS

| | | | |
|---|---|---|---|
| 2,760,898 | 8/1956 | Voelker | 156—293 |
| 2,817,620 | 12/1957 | Golick et al | 156—293 |
| 1,747,964 | 2/1930 | Wirth | 156—293 |
| 3,001,248 | 9/1961 | Verhagen et al. | 156—293 |

REUBEN EPSTEIN, Primary Examiner

S. HELLMAN, Assistant Examiner

U.S. Cl. X.R.

156—288